(12) United States Patent
Hung et al.

(10) Patent No.: US 9,519,617 B2
(45) Date of Patent: Dec. 13, 2016

(54) PROCESSOR WITH INSTRUCTION VARIABLE DATA DISTRIBUTION

(75) Inventors: Ching-Yu Hung, Pleasanton, CA (US); Shinri Inamori, Kawasaki (JP); Jagadeesh Sankaran, Allen, TX (US); Peter Chang, Colleyville, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1089 days.

(21) Appl. No.: 13/548,933

(22) Filed: Jul. 13, 2012

(65) Prior Publication Data

US 2013/0185544 A1 Jul. 18, 2013

Related U.S. Application Data

(60) Provisional application No. 61/507,652, filed on Jul. 14, 2011.

(51) Int. Cl.
*G06F 15/00* (2006.01)
*G06F 15/76* (2006.01)
*G06F 15/80* (2006.01)
*G06F 9/30* (2006.01)
*G06F 9/38* (2006.01)

(52) U.S. Cl.
CPC ......... *G06F 15/8053* (2013.01); *G06F 9/3012* (2013.01); *G06F 9/3013* (2013.01); *G06F 9/30036* (2013.01); *G06F 9/30043* (2013.01); *G06F 9/30065* (2013.01); *G06F 9/30087* (2013.01); *G06F 9/30098* (2013.01); *G06F 9/3887* (2013.01); *G06F 15/76* (2013.01); *G06F 15/8007* (2013.01)

(58) Field of Classification Search
CPC .. G06F 15/76; G06F 15/8053; G06F 9/30036; G06F 9/30065; G06F 9/3012; G06F 9/30043; G06F 9/30098; G06F 15/8007; G06F 9/3887; G06F 9/30087; G06F 9/3013
USPC .......................................................... 712/4
See application file for complete search history.

(56) References Cited

U.S. PATENT DOCUMENTS 5,893,159 A * 4/1999 Schneider ...................... 711/150
2005/0172106 A1* 8/2005 Ford et al. ..................... 712/210

* cited by examiner

*Primary Examiner* — Chun-Kuan Lee
(74) *Attorney, Agent, or Firm* — Robert D. Marshall, Jr.; Charles A. Brill; Frank D. Cimino

(57) ABSTRACT

A vector processor includes a plurality of execution units arranged in parallel, a register file, and a plurality of load units. The register file includes a plurality of registers coupled to the execution units. Each of the load units is configured to load, in a single transaction, a plurality of the registers with data retrieved from memory. The loaded registers corresponding to different execution units. Each of the load units is configured to distribute the data to the registers in accordance with an instruction selectable distribution. The instruction selectable distribution specifies one of plurality of distributions. Each of the distributions specifies a data sequence that differs from the sequence in which the data is stored in memory.

12 Claims, 8 Drawing Sheets

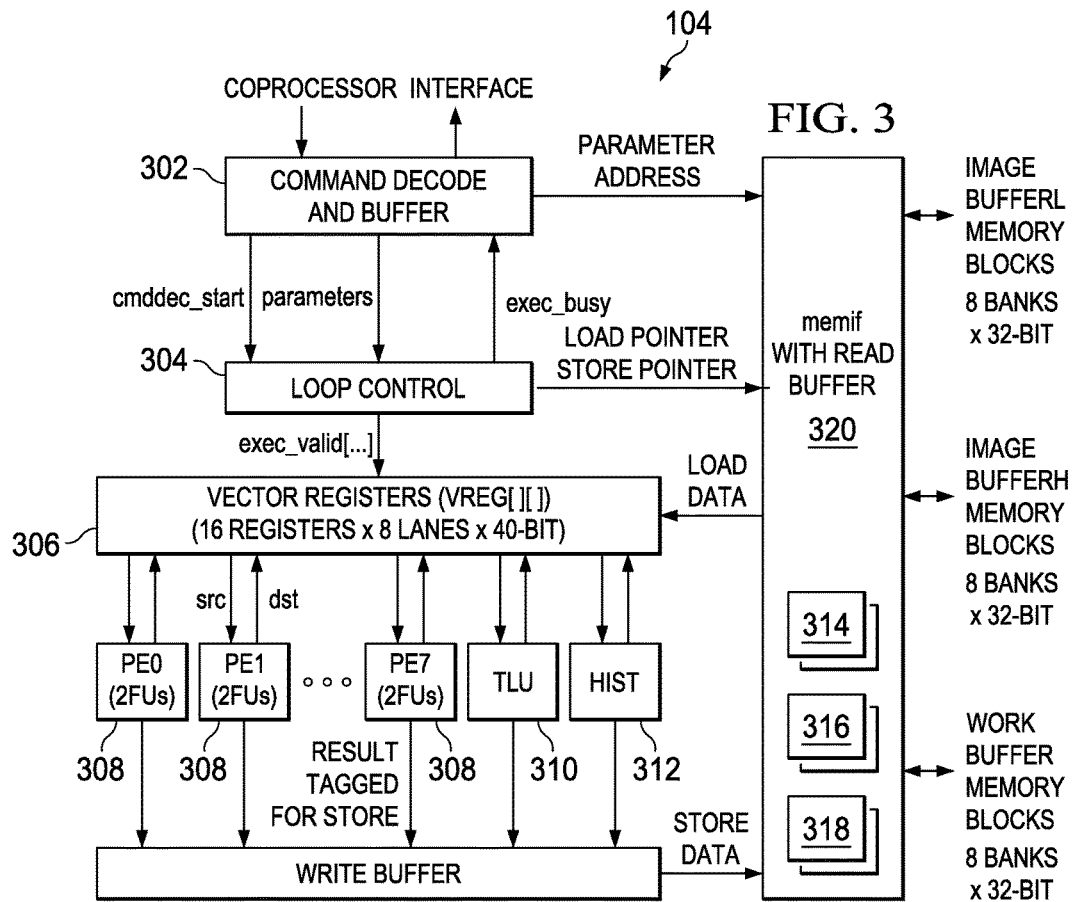
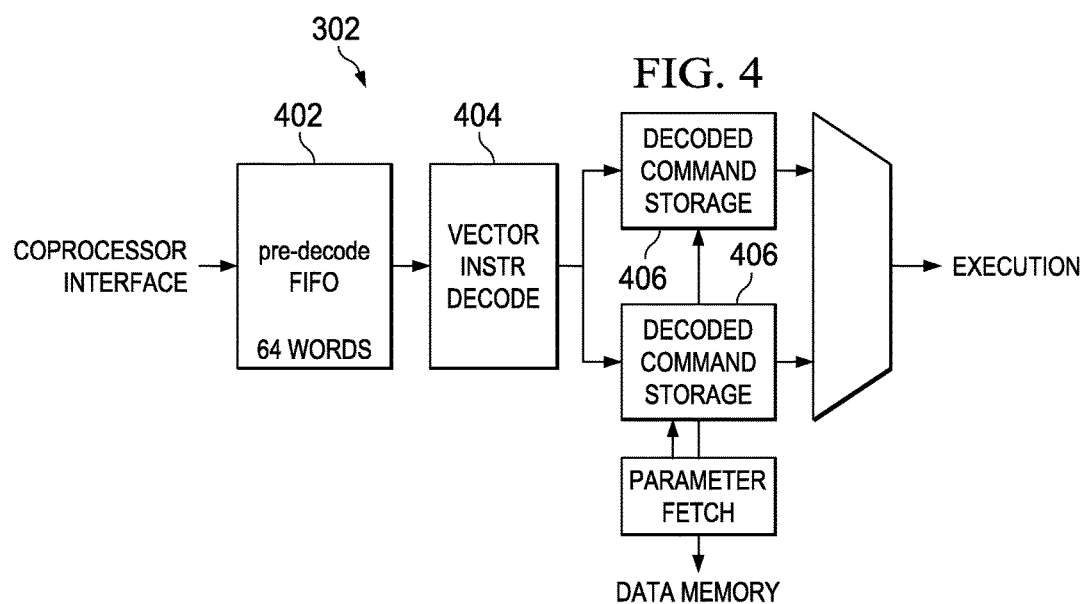

FIG. 7

| DISTRIBUTION | vreg[r][0] LOADED FROM | vreg[r][1] LOADED FROM | vreg[r][2] LOADED FROM | vreg[r][3] LOADED FROM | vreg[r][4] LOADED FROM | vreg[r][5] LOADED FROM | vreg[r][6] LOADED FROM | vreg[r][7] LOADED FROM |
|---|---|---|---|---|---|---|---|---|
| NPT | data[0] | data[1] | data[2] | data[3] | data[4] | data[5] | data[6] | data[7] |
| 1PT | data[0] | data[0] | data[0] | data[0] | data[0] | data[0] | data[0] | data[0] |
| CIRC2 | data[0] | data[1] | data[0] | data[1] | data[0] | data[1] | data[0] | data[1] |
| DS2 | data[0] | data[2] | data[4] | data[6] | data[8] | data[10] | data[12] | data[14] |
| US2 | data[0] | data[0] | data[1] | data[1] | data[2] | data[2] | data[3] | data[3] |
| DINTRLV | vreg[r][0] = data[0], vreg[r+1][0] = data[1] | vreg[r][1] = data[2], vreg[r+1][1] = data[3] | vreg[r][2] = data[4], vreg[r+1][2] = data[5] | vreg[r][3] = data[6], vreg[r+1][3] = data[7] | vreg[r][4] = data[8], vreg[r+1][4] = data[9] | vreg[r][5] = data[10], vreg[r+1][5] = data[11] | vreg[r][6] = data[12], vreg[r+1][6] = data[13] | vreg[r][7] = data[14], vreg[r+1][7] = data[15] |
| CUST_Pi | data[pf[0]] | data[pf[1]] | data[pf[2]] | data[pf[3]] | data[pf[4]] | data[pf[5]] | data[pf[6]] | data[pf[7]] |

FIG. 8

| DISTRIBUTION | vreg[r][0] STORED TO | vreg[r][1] STORED TO | vreg[r][2] STORED TO | vreg[r][3] STORED TO | vreg[r][4] STORED TO | vreg[r][5] STORED TO | vreg[r][6] STORED TO | vreg[r][7] STORED TO |
|---|---|---|---|---|---|---|---|---|
| NPT | dptr[0] | dptr[1] | dptr[2] | dptr[3] | dptr[4] | dptr[5] | dptr[6] | dptr[7] |
| 1PT | dptr[0] | N/A | N/A | N/A | N/A | N/A | N/A | N/A |
| DS2 | dptr[0] | N/A | dptr[1] | N/A | dptr[2] | N/A | dptr[3] | N/A |
| INTRLV | dptr[0] = vreg[r][0], dptr[1] = vreg[r+1][0] | dptr[2] = vreg[r][1], dptr[3] = vreg[r+1][1] | dptr[4] = vreg[r][2], dptr[5] = vreg[r+1][2] | dptr[6] = vreg[r][3], dptr[7] = vreg[r+1][3] | dptr[8] = vreg[r][4], dptr[9] = vreg[r+1][4] | dptr[10] = vreg[r][5], dptr[11] = vreg[r+1][5] | dptr[12] = vreg[r][6], dptr[13] = vreg[r+1][6] | dptr[14] = vreg[r][7], dptr[15] = vreg[r+1][7] |
| OFFST_NP1 | dptr[0] | dptr[9] | dptr[18] | dptr[27] | dptr[36] | dptr[45] | dptr[54] | dptr[63] |
| COLLAT | NONE OR *dptr++ | NONE OR *dptr++ | NONE OR *dptr++ | NONE OR *dptr++ | NONE OR *dptr++ | NONE OR *dptr++ | NONE OR *dptr++ | NONE OR *dptr++ |
| DDA | dptr[V0[0]] | dptr[V0[1]] | dptr[V0[2]] | dptr[V0[3]] | dptr[V0[4]] | dptr[V0[5]] | dptr[V0[6]] | dptr[V0[7]] |
| SKIP | dptr[0] | dptr[2] | dptr[4] | dptr[6] | dptr[8] | dptr[10] | dptr[12] | dptr[14] |

PROCESSOR WITH INSTRUCTION VARIABLE DATA DISTRIBUTION

CROSS-REFERENCE TO RELATED APPLICATION

The present application claims priority to U.S. Provisional Patent Application No. 61/507,652, filed on Jul. 14, 2011; which is hereby incorporated herein by reference in its entirety.

BACKGROUND

Various processor designs include coprocessors that are intended to accelerate execution of a given set of processing tasks. Some such coprocessors achieve good performance/area in typical processing tasks, such as scaling, filtering, transformation, sum of absolute differences, etc., executed by a digital signal processor (DSP). However, as the complexity of digital signal processing algorithms increases, processing tasks often require numerous passes of processing through a coprocessor, compromising power efficiency. Furthermore, access patterns required by DSP algorithms are becoming less regular, thereby negatively impacting the overall processing efficiency of coprocessors designed to accommodate more regular access patterns. Consequently, processor and coprocessor architectures that provide improved processing, power, and/or area efficiency are desirable.

SUMMARY

A processor that includes a control processor core and a vector processor core is disclosed herein. In one embodiment, a vector processor includes a plurality of execution units arranged in parallel, a register file, and a plurality of load units. The register file includes a plurality of registers coupled to the execution units. Each of the load units is configured to load, in a single transaction, a plurality of the registers with data retrieved from memory. The loaded registers correspond to different execution units. Each of the load units is also configured to distribute the data to the registers in accordance with an instruction selectable distribution. The instruction selectable distribution specifies one of plurality of distributions. Each of the distributions specifies a data sequence that differs from the sequence in which the data is stored in memory.

In another embodiment, a vector processor includes a plurality of execution units arranged in parallel, a register file, and a plurality of store units. The register file includes a plurality of registers coupled to the execution units. Each of the store units is configured to store, in a single transaction, data retrieved from the registers to a plurality of locations in memory. The stored registers correspond to different execution units. Each of the store units is also configured to distribute the data to the locations in memory in accordance with an instruction selectable distribution. The instruction selectable distribution specifies one of plurality of distributions. Each of the distributions specifies a data sequence that differs from the sequence in which the data is stored in the registers.

In a further embodiment, a processor includes a scalar processor core and a vector coprocessor core coupled to the scalar processor core. The vector coprocessor core is configured to execute vector instructions passed by the scalar processor core. The vector coprocessor core includes a plurality of execution units arranged to execute an instruction in parallel, a register file, a plurality of load units, and a plurality of store units. The register file includes a plurality of registers coupled to the execution units. The load units are configured to distribute data read from memory to a plurality of the registers in accordance with a load instruction selectable distribution that specifies a data sequence in the registers that differs from the sequence in which the data is stored in memory. The store units are configured to distribute data read from the registers to a plurality of locations in the memory in accordance with a store instruction selectable distribution that specifies a data sequence in the locations in memory that differs from the sequence in which the data is stored in registers.

BRIEF DESCRIPTION OF THE DRAWINGS

For a detailed description of exemplary embodiments of the invention, reference will now be made to the accompanying drawings in which:

FIG. 3 shows a block diagram of a vector coprocessor core in accordance with various embodiments;

FIG. 4 show a block diagram of an vector command buffer of the vector coprocessor core in accordance with various embodiments;

FIG. 7 shows a table of load unit data distributions in accordance with various embodiments; and FIG. 8 shows a table of store unit data distributions in accordance with various embodiments.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors. The terms "alternate," "alternating" and the like are used to designate every other one of a series.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
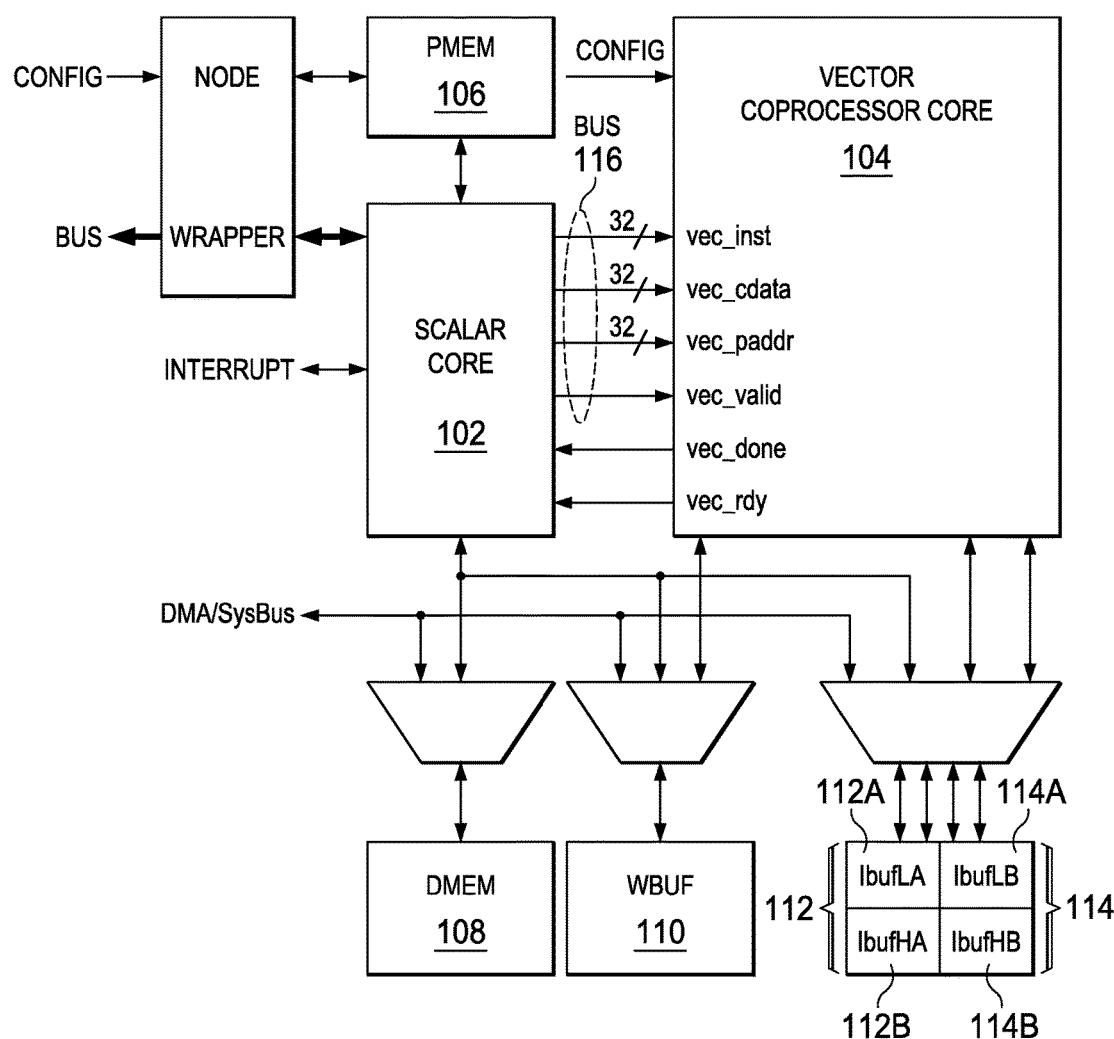
FIG. 1 shows a block diagram of a processor in accordance with various embodiments.

Embodiments of the processor disclosed herein provide improved performance without sacrificing area or power efficiency. FIG. 1 shows a block diagram of a processor 100 in accordance with various embodiments. The processor 100 includes a scalar processor core 102, a vector coprocessor core 104, a program memory 106, a data memory 108, a working buffer memory 110, an A buffer memory 112, and a B buffer memory 114. The A and B buffer memories 112, 114 are partitioned into a low and high A buffer memory (112A, 112B) and a low and high B buffer memory (114A, 114B) to allow simultaneous direct memory access (DMA) and access by the cores 102, 104. To support N-way processing by the vector coprocessor core 104, each of the working buffer memory 110, A buffer memory 112, and B buffer memory 114 may comprise N simultaneously accessible banks. For example, if the vector coprocessor core 104 is an 8-way single-instruction multiple-data (SIMD) core, then each of the working, A, and B buffers 110, 112, 114 may comprise 8 banks each of suitable word width (e.g., 32 bits or more wide) that are simultaneously accessible by the vector coprocessor core 104. A switching network provides signal routing between the memories 108, 110, 112, 114 and the various systems that share access to memory (e.g., DMA and the processor cores 102, 104).

Figure 2:
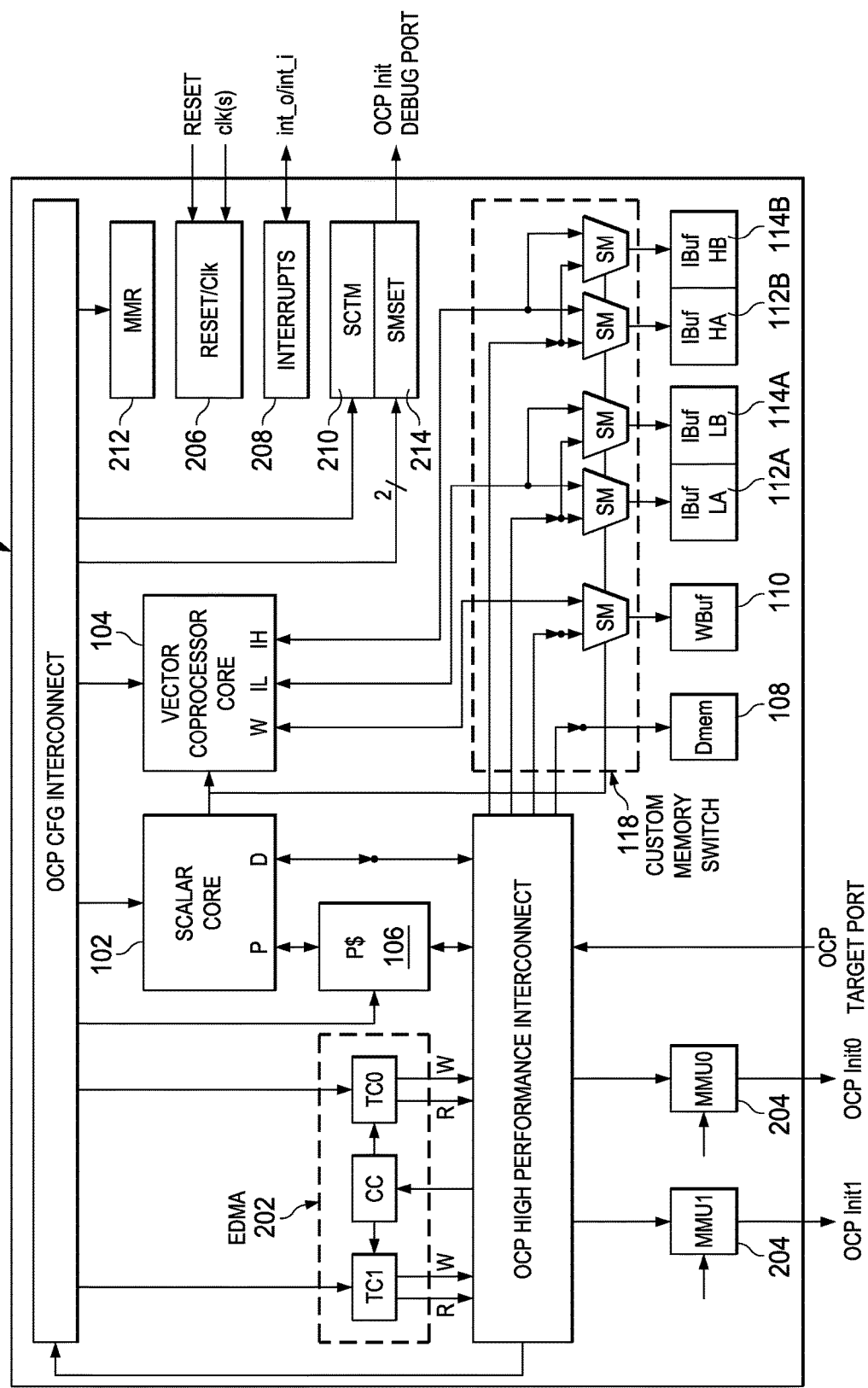
FIG. 2 shows a block diagram of a processor in accordance with various embodiments.

FIG. 2 shows a block diagram of the processor 100 including various peripherals, including DMA controller 202, memory management units 204, clock generator 206, interrupt controller 208, counter/time module 210, trace port 214, memory mapped registers 212 and various interconnect structures that link the components of the processor 100.

The scalar processor core 102 may be a reduced instruction set processor core, and include various components, such as execution units, registers, instruction decoders, peripherals, input/output systems and various other components and sub-systems. Embodiments of the scalar processor core 102 may include a plurality of execution units that perform data manipulation operations. For example, an embodiment of the scalar processor core 102 may include five execution units, a first execution unit performs the logical, shift, rotation, extraction, reverse, clear, set, and equal operations, a second execution unit performs data movement operations, a third execution unit performs arithmetic operations, a fourth execution unit performs multiplication, and a fifth execution unit performs division. In some embodiments, the scalar processor core 102 serves as a control processor for the processor 100, and executes control operations, services interrupts, etc., while the vector coprocessor core 104 serves as a signal processor for processing signal data (e.g., image signals) provided to the vector coprocessor core 104 via the memories 110, 112, 114.

The program memory 106 stores instructions to be executed by the scalar core 102 interspersed with instructions to be executed by the vector coprocessor core 104. The scalar processor core 102 accesses the program memory 106 and retrieves therefrom an instruction stream comprising instructions to be executed by the scalar processor core 102 and instructions to be executed by the vector coprocessor core 104. The scalar processor core 102 identifies instructions to be executed by the vector coprocessor core 104 and provides the instructions to the vector coprocessor core 104 via a coprocessor interface 116. In some embodiments, the scalar processor 102 provides vector instructions, control data, and/or loop instruction program memory addresses to the vector coprocessor core 104 via the coprocessor interface 116. The loop instruction program memory addresses may be provided concurrently with a loop instruction, and the control data may be provided concurrently with a control register load instruction. In some embodiments, the program memory 106 may be a cache memory that fetches instructions from a memory external to the processor 100 and provides the instructions to the scalar processor core 102.

FIG. 3 shows a block diagram of the vector coprocessor core 104 in accordance with various embodiments. The vector coprocessor core 104 may be an SIMD processor that executes instructions arranged as a loop. More specifically, the vector coprocessor core 104 executes vector instructions within a plurality of nested loops. In some embodiments, the vector coprocessor core 104 includes built-in looping control that executes instructions in four or more nested loops with zero looping overhead. The vector coprocessor core 104 includes a command decoder/buffer 302, loop control logic 304, a vector register file 306, processing elements 308, a table look-up unit 310, a histogram unit 312, load units 314, store units 316, and address generators 318. The load units 314 and store units 316 access the working buffer memory 110, an A buffer memory 112, and a B buffer memory 114 through a memory interface 320. The address generators 318 compute the addresses applied by the load and store units 314, 316 for accessing memory. Each address generator 318 is capable of multi-dimensional addressing that computes an address based on the indices of the nested loops and corresponding constants (e.g., address=base+ $i_1*const_1+i_2*const_2+i_3*const_3+i_4*const_4$ for 4-dimensional addressing where $i_n$ is a loop index for one of four nested loops).

The memory interface 320 connects the vector coprocessor core 104 via a lane of interconnect corresponding to each bank of each of memories 110, 112, 114. Thus, a memory 110, 112, 114 having eight parallel banks (e.g., 32-bit banks) connects to the vector coprocessor core 104 via eight parallel memory lanes, where each memory lane connects to a port of the memory interface 320. Memory lanes that connect to adjacent ports of the memory interface 320 are termed adjacent memory lanes.

The vector coprocessor core 104 is N-way SIMD, where in the embodiment of FIG. 3, N=8. N may be different in other embodiments. Thus, the coprocessor core 104 includes N processing lanes, where each lane includes a processing element 308 and a set of registers of the vector register file 306 that provide operands to and store results generated by the processing element 308. Each processing element 308 may include a plurality of function units that operate on (e.g., multiply, add, compare, etc.) the operands provided by the register file 306. Accordingly, the register file 306 is N-way and includes storage of a plurality of entries. For example, the register file 306 may be N×16 where the register file includes sixteen registers for each of the N ways of the vector coprocessor core 104. Corresponding registers of adjacent ways are termed adjacent registers. Thus, a register R0 of SIMD way 0 is adjacent to register R0 of SIMD way 1. Similarly, register R0 of SIMD way 0 and register 0 of SIMD way 2 are alternate registers. The processing elements 308 and the registers of the register file 306 are sized to process data values of various sizes. In some embodiments, the processing elements 308 and the registers of the register file 306 are sized to process 40 bit and smaller data values (e.g., 32 bit, 16 bit, 8, bit). Other embodiments may be sized to process different data value sizes.

As noted above, the vector coprocessor core 104 repeatedly executes a vector instruction sequence (referred to as a vector command) within a nested loop. The nested looping is controlled by the loop control logic 304. While the vector coprocessor core 104 is executing vector commands, the scalar core 102 continues to decode and execute the instruction stream retrieved from program memory 106, until execution of a coprocessor synchronization instruction (by the scalar core 102) forces the scalar core 102 to stall for vector coprocessor core 104 vector command completion. While the scalar core 102 is stalled, the scalar core 102 may service interrupts unless interrupt processing is disabled. Thus, the scalar core 102 executes instructions and services interrupts in parallel with vector coprocessor core 104 instruction execution. Instruction execution by the scalar core 102 may be synchronized with instruction execution by the vector coprocessor core 104 based on the scalar core 102 executing a synchronization instruction that causes the scalar core 102 to stall until the vector coprocessor core 104 asserts a synchronization signal indicating that vector processing is complete. Assertion the synchronization signal may be triggered by execution of a synchronization instruction by the vector coprocessor core 104.

The command decode/buffer 302 of the vector coprocessor core 104 includes an instruction buffer that provides temporary storage for vector instructions. FIG. 4 shows a block diagram of the command decode/buffer 302 of the vector coprocessor core 104 in accordance with various embodiments. The command decode/buffer 302 includes a pre-decode first-in first-out (FIFO) buffer 402, a vector instruction decoder 404, and vector command storage buffers 406. Each vector command storage buffer 406 includes capacity to store a complete vector command of maximum size. Vector instructions flow from the scalar processor core 102 through the pre-decode FIFO 402 and are decoded by the vector instruction decoder 404. The decoded vector instructions corresponding to a give vector command are stored in one of the vector command storage buffers 406, and each stored vector command is provided for execution in sequence. Execution of a decoded vector command is initiated (e.g., the vector command is read out of the vector command storage buffer 406) only after the complete vector command is decoded and stored in a vector command storage buffer 406. Thus, the command decode/buffer 302 loads a vector command into each of the vector command storage buffers 406, and when the vector command storage buffers 406 are occupied additional vector instructions received by the command decode/buffer 302 are stored in the pre-decode buffer 402 until execution of a vector command is complete, at which time the FIFO buffered vector command may be decoded and loaded into the emptied vector command storage buffer 406 previously occupied by the executed vector command.

Figure 5:
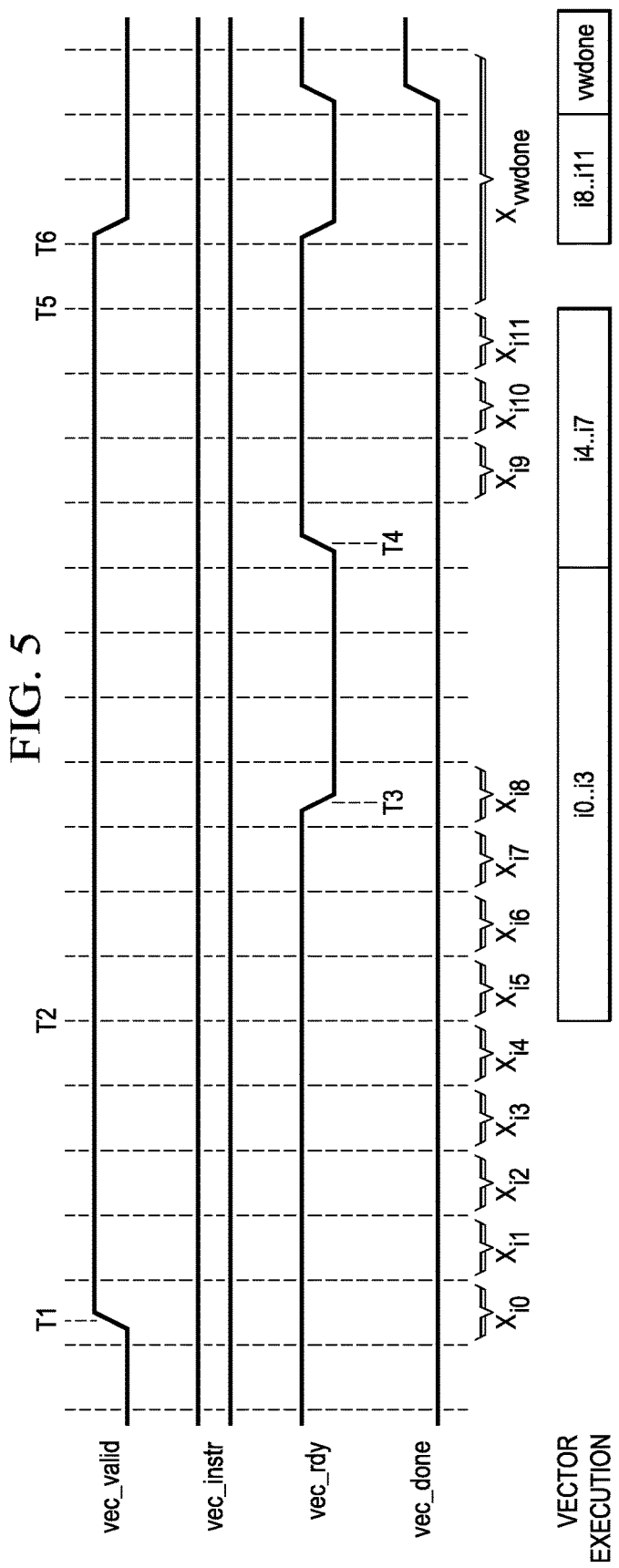
FIG. 5 shows a diagram of scalar processor core and vector coprocessor core execution interaction in accordance with various embodiments.

FIG. 5 shows a diagram of scalar processor core 102 and vector coprocessor core 104 interaction in accordance with various embodiments. In FIG. 5, vector instructions i0-i3 form a first exemplary vector command, vector instructions i4-i7 form a second exemplary vector command, and vector instructions i8-i11 form a third exemplary vector command. At time T1, the scalar processor core 102 recognizes vector instructions in the instruction stream fetched from program memory 106. In response, the scalar processor core 102 asserts the vector valid signal (vec_valid) and passes the identified vector instructions to the vector coprocessor core 104. At time T2, the first vector command has been transferred to the vector coprocessor core 104, and the vector coprocessor core 104 initiates execution of the first vector command while the scalar processor core 102 continues to transfer the vector instructions of the second vector command to the vector coprocessor core 104. At time T3, transfer of the second vector command to the vector coprocessor core 104 is complete, and the execution of the first vector command is ongoing. Consequently, the vector coprocessor core 104 negates the ready signal (vec_rdy) which causes the scalar processor core 102 to discontinue vector instruction transfer. At time T4, execution of the first vector command is complete, and execution of the second vector command begins. With completion of the first vector command, vector coprocessor core 104 asserts the ready signal, and the command decode/buffer 302 receives the vector instructions of the third vector command. At time T5, the vector coprocessor core 104 completes execution of the second vector command. At time T6, transfer of the third vector command is complete, and the vector coprocessor core 104 initiates execution of the third vector command. A VWDONE instruction follows the last instruction of the third vector command. The VWDONE instruction causes the scalar processor core 102 to stall pending completion of the third vector command by the vector coprocessor core 104. When the vector coprocessor core 104 completes execution of the third vector command, the vector coprocessor core 104 executes the VWDONE command which causes the vector coprocessor core 104 to assert the vector done signal (vec_done). Assertion of the vector done signal allows the scalar processor core 102 to resume execution, thus providing core synchronization.

Within the multi-level nested loop executed by the vector coprocessor core 104, operations of vector command execution can be represented as sequential load, arithmetic operation, store, and pointer update stages, where a number of operations may be executed in each stage. The following listing shows a skeleton of the nested loop model for a four loop embodiment of the vector coprocessor core 104. There are 4 loop variables, i1, i2, i3, and i4. Each loop variable is incremented from 0 to Ipend 1 . . . 4.

```
EVE_compute( . . . )
{
    for (i1=0; i1<=lpend1; i1++) {
        for (i2=0; i2<=lpend2; i2++) {
            for (i3=0; i3<=lpend3; i3++) {
                for (i4=0; i4<=lpend4; i4++) {
                    for (k=0; k<num_inits; k++)
                        initialize_vreg_from_parameters( . . . );
                    for (k=0; k<num_loads; k++)
                        load_vreg_from_local_memory( . . . );
                    for (k=0; k<num_ops; k++)
                        op( . . . );  // 2 functional units, executing 2 ops per
                                      cycle
                    for (k=0; k<num_stores; k++)
                        store_vreg_to_local_memory( . . . );
                    for (k=0; k<num_agens; k++)
                        update_agen( . . . );
                }
            }
        }
    }
}
```

Each iteration of the innermost loop (i4) executes in a number of cycles equal to the maximal number of cycles spent in execution of loads, arithmetic operations, and stores within the loop. Cycle count for the arithmetic operations is constant for each interation, but cycle count for load and store operations can change depending on pointer update, loop level, and read/write memory contention.

Embodiments define a vector command with a loop initiation instruction, VLOOP.

VLOOP cmd_type, CL#:cmd_len, PL#: param_len where:
cmd_type specifies the loop type: compute (executed by the processing elements), table lookup (executed by the table lookup unit), or histogram (executed by the histogram unit);
cmd_len specifies the length of the vector command; and
param_len specifies the length of the memory stored parameter file associated with the vector command.

The vector instructions following VLOOP initialize the registers and address generators of the vector coprocessor core 104, and specify the load operations, arithmetic and data manipulation operations, and store operations to be performed with the nested loops. The parameters applicable to execution of a vector command (e.g., loop counts, address pointers to arrays, constants used in the computation, round/truncate shift count, saturation bounds, etc.) may be stored in memory (e.g., 110, 112, 114) by the scalar processor core 104 as a parameter file and retrieved by the vector coprocessor core 102 as part of loop initialization.

While embodiments of the vector coprocessor core 104 may always execute a fixed number of nested loops (e.g., 4 as shown in the model above), with loop terminal counts of zero or greater, some embodiments include an optional outermost loop (e.g., an optional fifth loop). The optional outermost loop encompasses the fixed number of nested loops associated with the VLOOP instruction, and may be instantiated separately from the fixed number of nested loops. As with the nested loops associated with the VLOOP instruction, execution of the optional outermost loop requires no looping overhead. Each iteration of the optional outermost loop may advance a parameter pointer associated with the nested loops. For example, the parameter pointer may be advanced by param_len provided in the VLOOP instruction. The parameter pointer references the parameter file that contains the parameters applicable to execution of the vector command as explained above (loop counts, etc.). By changing the parameters of the vector command with each iteration of the outermost loop, embodiments of the vector coprocessor core 104 can apply the vector command to objects/structures/arrays of varying dimension or having varying inter-object spacing. For example, changing loop counts for the nested loops allows the vector coprocessor core 104 to processes objects of varying dimensions with a single vector command, and without the overhead of a software loop.

The loop count of the optional outer loop and the parameter pointer may be set by execution of an instruction by the vector coprocessor core 104. The instruction may load a parameter into a control register of the core 104 as:

VCTRL<scalar_register>, <control_register> where:
scalar_register specifies a register containing a value to loaded as an outermost loop count or parameter pointer; and
control_register specifies a destination register, where the destination register may be the outermost loop end count register or the vector command parameter pointer register.

Execution of a vector command may be complete when a total number of iterations specified in the parameter file for each loop of the vector command are complete. Because it is advantageous in some situations to terminate the vector command prior to execution of all specified loop iterations, the vector coprocessor core 104 provides early termination of a vector command. Early termination is useful when, for example, the vector command has identified a condition in the data being processed that makes additional processing of the data superfluous. Early termination of a vector command is provided for by execution, in the vector command, of a loop early exit instruction defined as:

VEXITNZ level, src1 where:
level specifies whether a vector command (i.e., loops associated with a VLOOP instruction) or an optional outermost loop is to be exited; and
src1 specifies a register containing a value that determines whether to perform the early exit.

Execution of the VEXITNZ instruction causes the vector coprocessor core 104 to examine the value contained in the register src1 (e.g., associated with a given SIMD lane), and to schedule loop termination if the value is non-zero. Other embodiments may schedule loop termination based on other conditions of the value (e.g., zero, particular bit set, etc.). If the level parameter indicates that the vector command is to be exited, then the vector coprocessor core 104 schedules the nested loops associated with the vector command to terminate after completion of the current iteration of the innermost of the nest loops. Thus, if the level parameter indicates that the vector command is to be exited, any optional outmost loop encompassing the vector command is not exited, and a next iteration of the vector command may be executed.

If the level parameter indicates that the optional outermost loop is to be exited, then, on identification of the terminal state of src1, the vector coprocessor core 104 schedules the optional outermost loop to terminate after completion of all remaining iterations of the nested loops associated with the vector command encompassed by the optional outermost loop.

The load units 314 move data from the memories 110, 112, 114 to the registers of the vector register file 306, and include routing circuitry that distributes data values retrieved from the memories 110, 112, 114 to the registers in various patterns that facilitate efficient processing. Load instructions executed by the vector coprocessor core 104 specify how the data is to be distributed to the registers. FIGS. 6A-6FH show load data distributions provided by the load unit 314 of the vector coprocessor core 104 in accordance with various embodiments. While the illustrative distributions of FIGS. 6A-6F are directed loading data values of a given size (e.g., 16 bits), embodiments of the load units 314 may apply similar distributions to data values of other sizes (e.g., 8 bits, 32 bits, etc.). The load units 314 may move data from memory 110, 112, 114 to the vector registers 306 with instruction specified distribution in a single instruction cycle.

Figure 6A:
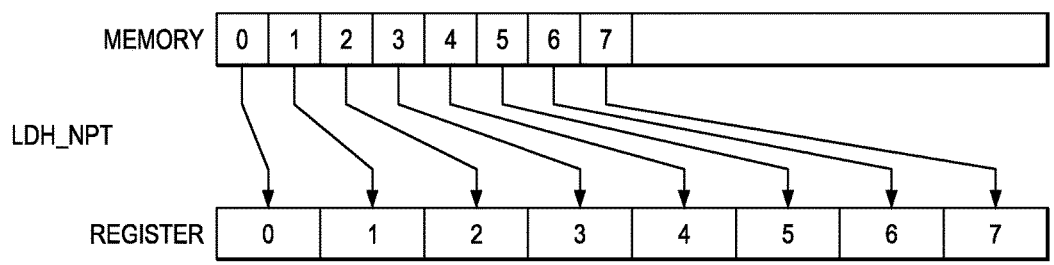
FIGS. 6A-6F show load data distributions provided by a load unit of a vector coprocessor core in accordance with various embodiments.

FIG. 6A shows a load unit 314 retrieving a data value from each of eight locations of a memory 110, 112, 114, (e.g., a value from each of eight banks) via eight adjacent lanes and distributing the retrieved data values to eight adjacent registers of the vector register file 306 (e.g., a register corresponding to each SIMD lane). More generally, the load unit 314 moves a value from memory via each of a plurality adjacent lanes, and distributes the data values to a plurality of adjacent registers of the vector register file 306 in a single instruction cycle.

Figure 6B:
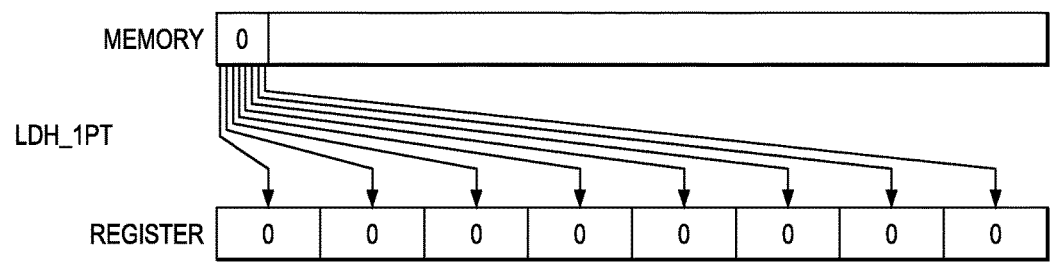

FIG. 6B shows a load unit 314 retrieving a data value from a single location of a memory 110, 112, 114, and distributing the retrieved data value to each of eight adjacent registers of the vector register file 306. More generally, the load unit 314 moves a value from a single location of a memory 110, 112, 114, and distributes the data value to a plurality of adjacent registers of the vector register file 306 in a single instruction cycle. Thus, the load unit 314 may distribute a single value from memory 110, 112, 114 to each of N ways of the vector coprocessor core 104.

Figure 6C:
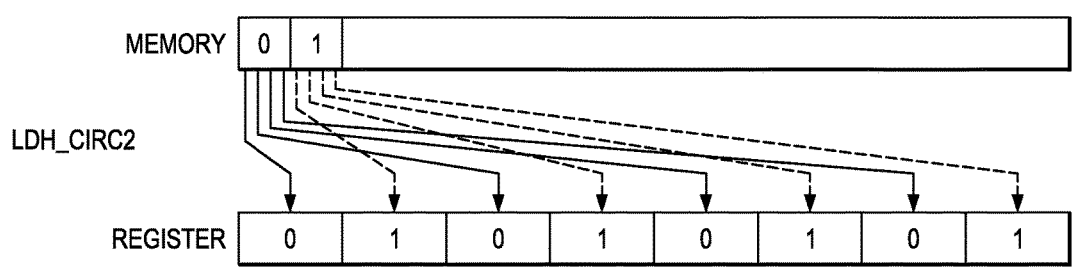

FIG. 6C shows a load unit 314 retrieving a data value from each of two locations of a memory 110, 112, 114 via adjacent lanes, and distributing the retrieved data values to each of four adjacent pairs of registers of the vector register file 306. More generally, the load unit 314 moves a value from each of two locations of a memory 110, 112, 114 via adjacent lanes, and distributes the data value to a plurality of adjacent pairs of registers of the vector register file 306 in a single instruction cycle. That is, each value of the pair of values is written to alternate registers of the register file 306 (e.g., one value to odd indexed registers and the other value to even indexed registers). Thus, the load unit 314 may distribute a pair of values from memory 110, 112, 114 to each of N/2 way pairs of the vector coprocessor core 104.

Figure 6D:
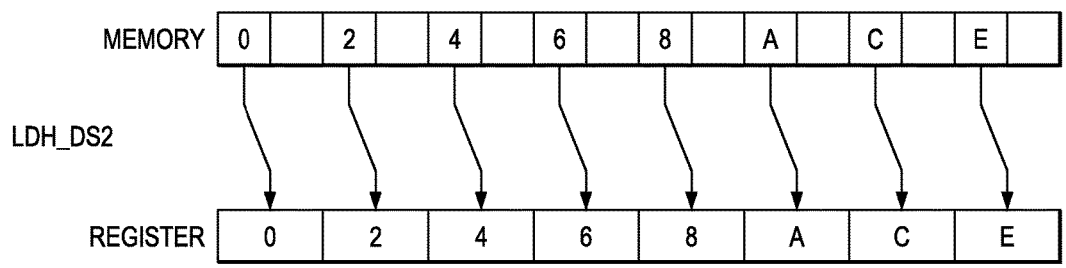

FIG. 6D shows a load unit 314 retrieving a data value from each of eight locations of a memory 110, 112, 114 via alternate lanes (e.g., from odd indexed locations or even indexed locations), and distributing the retrieved data values to eight adjacent registers of the vector register file 306. More generally, the load unit 314 moves a value from each of a plurality of locations of a memory 110, 112, 114 via alternate lanes, and distributes the data values to a plurality of adjacent registers of the vector register file 306 in a single instruction cycle. Thus, the load unit 314 provides down-sampling of the data stored in memory by a factor of two.

Figure 6E:
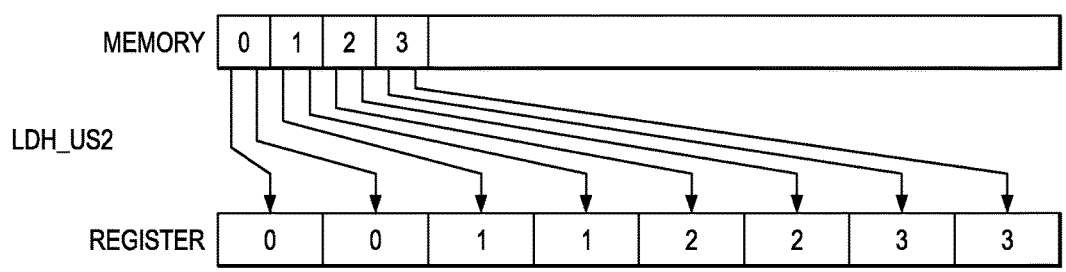

FIG. 6E shows a load unit 314 retrieving a data value from each of four locations of a memory 110, 112, 114 via adjacent lanes, and distributing each of the retrieved data values to two adjacent registers of the vector register file 306. More generally, the load unit 314 moves a value from each of a plurality locations of a memory 110, 112, 114 via adjacent lanes, and distributes each of the data values to two adjacent registers of the vector register file 306 in a single instruction cycle. Thus, the load unit 314 provides up-sampling of the data stored in memory by a factor of two.

Figure 6F:
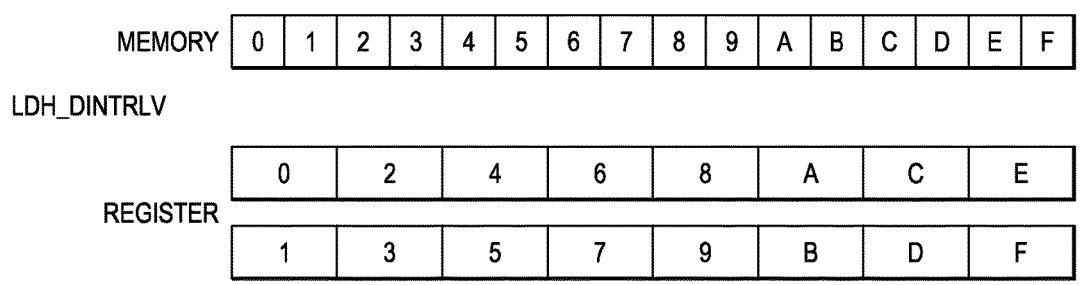

FIG. 6F shows a load unit 314 retrieving a data value from each of sixteen locations of a memory 110, 112, 114 via adjacent lanes, and distributing each of the retrieved data values to registers of the vector register file 306 such that data values retrieved via even numbered lanes are distributed to adjacent registers and data values retrieved via odd numbered lanes are distributed to adjacent registers. More generally, the load unit 314 moves a value from each of a plurality locations of a memory 110, 112, 114 via adjacent lanes, and distributes the data values in deinterleaved fashion to two sets of adjacent registers of the vector register file 306. Thus, the load unit 314 provides deinterleaving of data values across registers M and M+1 where register M encompasses a given register of each way of the N-way vector coprocessor core 104 in a single instruction cycle.

Some embodiments of the load unit 314 also provide custom distribution. With custom distribution, the load unit 314 distributes one or more data values retrieved from a memory 110, 112, 114 to registers of the vector register file 306 in accordance with a distribution pattern specified by an instruction loaded distribution control register or a distribution control structure retrieved from memory. Load with custom distribution can move data from memory to the vector register file 306 in a single instruction cycle. The custom distribution may be arbitrary. Custom distribution allows the number of values read from memory, the number of registers of the register file 306 loaded, and the distribution of data to the registers to be specified. In some embodiments of the load unit 314, custom distribution allows loading of data across multiple rows of the vector register file 306 with instruction defined distribution. For example, execution of a single custom load instruction may cause a load unit 314 to move values from memory locations 0-7 to registers V[0][0-7] and move values from memory locations 3-10 to registers V[1][0-7]. Such data loading may be applied to facilitate motion estimation searching in a video system.

Some embodiments of the load unit 314 further provide for loading with expansion. In loading with expansion, the load unit 314 retrieves a compacted (collated) array from a memory 110, 112, 114 and expands the array such the elements of the array are repositioned (e.g., to precompacted locations) in registers of the vector register file 306. The positioning of each element of the array is determined by expansion information loaded into an expansion control register via instruction. For example, given array {A,B,C} retrieved from memory and expansion control information {0,0,1,0,1,1,0,0}, the retrieved array may be expanded to {0,0,A,0,B,C,0,0} and written to registers of the register file 306. Load with expansion moves data from memory to the vector register file 306 with expansion in a single instruction cycle.

FIG. 7 shows a table of data distributions that may be implemented by the load unit 314 in accordance with various embodiments. Operation of the load units 314 may be invoked by execution of a vector load instruction by the vector coprocessor core 104. The vector load instruction may take the form of:

VLD<type>_<distribution>base[agen], vreg where:

type specifies the data size (e.g., byte, half-word, word, etc.);

distribution specifies the data distribution option (described above) to be applied;

base specifies a register containing an address;

agen specifies an address generator for indexing; and vreg specifies a vector register to be loaded.

The timing of vector load instruction execution may be determined by the load units 314 (i.e., by hardware) based, for example, on when the data retrieved by the load is needed by the processing elements 308, and memory interface availability. In contrast, the timing of the computations performed by the processing elements 308 may be determined by the sequence of vector instructions provided by the scalar processor core 102.

The store units 316 include routing circuitry that distributes data values retrieved from the registers of the vector register file 306 to locations in the memories 110, 112, 114 in various patterns that facilitate efficient processing. Store instructions executed by the vector coprocessor core 104 specify how the data is to be distributed to memory. At least some of the data distributions provide by the store unit 316 reverse the data distributions provided by the load units 314. The store units 316 may provide the data distributions described herein for data values of various lengths (e.g., 32, 16, 8 bit values). The store units 316 move data from the vector registers 306 to memory 110, 112, 114 with instruction specified distribution in a single instruction cycle.

A store unit 316 may move data from a plurality of adjacent registers of the register file 306 to locations in memory 110, 112, 114 via adjacent memory lanes in a single instruction cycle. For example, data values corresponding to a given register of each of N-ways of the vector coprocessor core 104 may be moved to memory via adjacent memory lanes in a single instruction cycle. The store unit 316 may also move a value from a single given register of the register file 306 to a given location in memory 110, 112, 114 in a single instruction cycle.

The store unit 316 may provide downsampling by a factor of two by storing data retrieved from alternate registers of the vector register file 306 (i.e., data from each of alternate ways of the vector coprocessor core 104) to locations of memory 110, 112, 114 via adjacent memory lanes. Thus, the store unit 316 may provide an operation that reverses the upsampling by two shown in FIG. 6E. The store unit 316 provides the movement of data from registers to memory with down sampling in a single instruction cycle.

Embodiments of the store unit 316 may provide interleaving of data values retrieved from registers of the vector register file 306 while moving the data values to memory. The interleaving reverses the distribution shown in FIG. 6F such that data values retrieved from a first set of adjacent registers are written to memory locations via even indexed memory lanes and data values retrieved from a second set of adjacent registers are interleaved therewith by writing the data values to memory locations via odd indexed memory lanes. The store unit 316 provides the movement of data from registers to memory with interleaving in a single instruction cycle.

Embodiments of the store unit 316 may provide for transposition of data values retrieved from registers of the vector register file 306 while moving the data values to memory, where, for example, the data values form a row or column of an array. Data values corresponding to each way of the vector coprocessor core 104 may be written to memory at an index corresponding to the index of the register providing the data value times the number of ways plus one. Thus, for 8-way SIMD, reg[0] is written to mem[0], reg[1] is written to mem[9], reg[2] is written to mem[18], etc. Where, the transposed register values are written to different banks of memory, the store unit 316 provides movement of N data values from registers to memory with transposition in a single instruction cycle.

Embodiments of the store unit 316 may provide collation of data values retrieved from registers of the vector register file 306 while moving the data values to memory. The collating reverses the expansion distribution provided by the load units 314. The collation compacts the data retrieved from adjacent registers of the vector register file 306, by writing to locations of memory via adjacent memory lanes those data values identified in collation control information stored in a register. For example, given registers containing an array {0,0,A,0,B,C,0,0} and collation control information {0,0,1,0,1,1,0,0}, the store unit 316 stores {A,B,C} in memory. The store unit 316 provides the movement of data from registers to memory with collation in a single instruction cycle.

Embodiments of the store unit 316 may provide data-driven addressing (DDA) of data values retrieved from registers of the vector register file 306 while moving the data values to memory. The data-driven addressing generates a memory address for each of a plurality of adjacent registers of the vector register file 306 using offset values provided from a DDA control register. The DDA control register may be a register of the vector register file corresponding the way of the register containing the value to written to memory. Register data values corresponding to each of the N ways of the vector coprocessor core may be stored to memory in a single instruction cycle if the DDA control register specified offsets provide for the data values to be written to different memory banks. If the DDA control register specified offsets provide for the data values to be written to memory banks that preclude simultaneously writing all data values, then the store unit 316 may write the data values in a plurality of cycles selected to minimize the number of memory cycles used to write the register values to memory.

Embodiments of the store unit 316 may provide for moving data values retrieved from a plurality of adjacent registers of the vector register file 306 to locations of the memory via alternate memory lanes, thus skipping every other memory location. The store units 316 may write the plurality of data values to alternate locations in memory 110, 112, 114 in a single instruction cycle.

FIG. 8 shows a table of data distributions that may be implemented by the store unit 316 in accordance with various embodiments. Operation of the store units 316 may be invoked by execution of a vector store instruction by the vector coprocessor core 104. The vector store instruction may take the form of:

[pred]VST<type>_<distribution>_<wr_loop>vreg, base [agen], RND_SAT: rnd_sat_param where:
 pred specifies a register containing a condition value that determines whether the store is performed;
 type specifies the data size (e.g., byte, half-word, word, etc.);
 distribution specifies the data distribution option to be applied;
 wr_loop specifies the nested loop level where the store is to be performed;
 vreg specifies a vector register to be stored;
 base specifies a register containing an address;
 agen specifies an address generator for indexing; and
 RND_SAT: rnd_sat_param specifies the rounding/saturation to be applied to the stored data.

The store units 316 provide selectable rounding and/or saturation of data values as the values are moved from the vector registers 306 to memory 110, 112, 114. Application of rounding/saturation adds no additional cycles to the store operation. Embodiments may selectably enable or disable rounding. With regard to saturation, embodiments may selectably perform saturation according to following options:
 NO_SAT: no saturation performed;
 SYMM: signed symmetrical saturation [-bound, bound] (for unsigned store, [0, bound]);
 ASYMM: signed asymmetrical saturation [-bound-1, bound] (for unsigned store, [0, bound]), useful for fixed bit width. For example, when bound=1023, saturate to [−1024, 1023];
 4 PARAM: use 4 parameter registers to specify sat_high_cmp, sat_high_set, sat_low_cmp, sat_low_set;
 SYMM32: use 2 parameter registers to specify a 32-bit bound, then follow SYMM above; and
 ASYMM32: use 2 parameter registers to specify a 32-bit bound, then follow ASYMM above.

The timing of vector store instruction execution is determined by the store units 316 (i.e., by hardware) based, for example, on availability of the memories 110, 112, 114. In contrast, the timing of the computations performed by the processing elements 308 may be determined by the sequence of vector instructions provided by the scalar processor core 102.

The processing elements 308 of the vector coprocessor core 104 include logic that accelerates SIMD processing of signal data. In SIMD processing, each of the N processing lanes (e.g., the processing element of the lane) is generally isolated from each of the other processing lanes. Embodiments of the vector coprocessor core 104 improve SIMD processing efficiency by providing communication between the processing elements 308 of the SIMD lanes.

Some embodiments of the vector coprocessor core 104 include logic that compares values stored in two registers of the vector register file 306 associated with each SIMD processing lane. That is values of two registers associated with a first lane are compared, values of two registers associated with a second lane are compared, etc. The vector coprocessor core 104 packs the result of the comparison in each lane into a data value, and broadcasts (i.e., writes) the data value to a destination register associated with each SIMD lane. Thus, the processing element 308 of each SIMD lane is provided access to the results of the comparison for all SIMD lanes. The vector coprocessor core 104 performs the comparison, packing, and broadcasting as execution of a vector bit packing instruction, which may be defined as:
 VBITPK src1, src2, dst
where:
 src1 and src2 specify the registers to be compared; and
 dst specifies the register to which the packed comparison results are to be written.

Some embodiments of the vector coprocessor core 104 include logic that copies a value of one register to another within each SIMD lane based on a packed array of flags, where each flag corresponds to an SIMD lane. Thus, given the packed flag value in a register, each SIMD lane identifies the flag value corresponding to the lane (e.g., bit 0 of the register for lane 0, bit 1 of the register for lane 1, etc.). If the flag value is "1" then a specified source register of the lane is copied to a specified destination register of the lane. If the flag value is "0" then zero is written to the specified destination register of the lane. The vector coprocessor core 104 performs the unpacking of the flag value and the register copying as execution of a vector bit unpacking instruction, which may be defined as:
 VBITUNPK src1, src2, dst
where:
 src1 specifies the register containing the packed per lane flag values;
 src2 specifies the register to be copied based on the flag value for the lane; and
 dst specifies the destination register to written.

Some embodiments of the vector coprocessor core 104 include logic that transposes values of a given register across SIMD lanes. For example, as shown below, a given register in each of a 4-way vector coprocessor core 104 contains the values 8, 4, 0xC, and 2. The vector coprocessor core 104 transposes the bit values such that bit 0 values of each lane are written to the specified destination register of lane 0, bit 1 values of each lane are written to the specified destination register of lane 1, etc.

Source:

| lane | value | bit position | | | |
|---|---|---|---|---|---|
| | | 0 | 1 | 2 | 3 |
| 0 | 1 | 1 | 0 | 0 | 0 |
| 1 | 2 | 0 | 1 | 0 | 0 |
| 2 | 3 | 1 | 1 | 0 | 0 |
| 3 | 4 | 0 | 0 | 1 | 0 |

Destination:

| lane | value | bit position | | | |
|---|---|---|---|---|---|
| | | 0 | 1 | 2 | 3 |
| 0 | 5 | 1 | 0 | 1 | 0 |
| 1 | 6 | 0 | 1 | 1 | 0 |
| 2 | 8 | 0 | 0 | 0 | 1 |
| 3 | 0 | 0 | 0 | 0 | 0 |

Thus, the vector coprocessor core 104 transposes the bits of the source register across SIMD lanes. The vector coprocessor core 104 performs the transposition as execution of a vector bit transpose instruction, which may be defined as:
 VBITTR src1, dst
where:
 src1 specifies the register containing the bits to be transposed; and
 dst specifies the register to which the transposed bits are written.

Some embodiments of the processing element 308 include logic that provides bit level interleaving and deinterleaving of values stored in registers of the vector register file 306 corresponding to the processing element 308. For example, the processing element 308 may provide bit interleaving as shown below. In bit interleaving the bit values of two specified source registers are interleaved in a destination register, such that successive bits of each source register are written to alternate bit locations of the destination register.
 src=0x25 (0000_0000_0010_0101),
 src2=0x11 (0000_0000_0001_0001),
 dst=0x523
  (0000_0000_0000_0000_0000_1001_0010_0011)
The processing element 308 performs the interleaving as execution of a vector bit interleave instruction, which may be defined as:
 VBITI src1, src2, dst
where:
 src1 and src2 specify the registers containing the bits to be interleaved; and
 dst specifies the register to which the interleaved bits are written.

The processing element 308 executes deinterleaving to reverse the interleaving operation described above. In deinterleaving, the processing element 308 writes even indexed bits of a specified source register to a first destination register and writes odd indexed bits to a second destination register. For example:
 src=0x523
  (0000_0000_0000_0000_0000_1001_0010_0011)
 dst1=0x25 (0000_0000_0010_0101),
 dst2=0x11 (0000_0000_0001_0001),
The processing element 308 performs the deinterleaving as execution of a vector bit deinterleave instruction, which may be defined as:
 VBITDI src, dst1, dst2,
where:
 src specifies the register containing the bits to be deinterleaved; and
 dst1 and dst2 specify the registers to which the deinterleaved bits are written.

Embodiments of the vector coprocessor core 104 may also interleave register values across SIMD lanes. For example, for 8-way SIMD, the vector coprocessor core 104 may provide single element interleaving of two specified source registers as:

dst1[0]=src1[0];
dst1[1]=src2[0];
dst1[2]=src1[1];
dst1[3]=src2[1];
dst1[4]=src1[2];
dst1[5]=src2[2];
dst1[6]=src1[3];
dst1[7]=src2[3];
dst2[0]=src1[4];
dst2[1]=src2[4];
dst2[2]=src1[5];
dst2[3]=src2[5];
dst2[4]=src1[6];
dst2[5]=src2[6];
dst2[6]=src1[7];
dst2[7]=src2[7];

where the bracketed index value refers the SIMD lane. The vector coprocessor core 104 performs the interleaving as execution of a vector interleave instruction, which may be defined as:

VINTRLV src1/dst1, src2/dst2, where src1/dst1 and src2/dst2 specify source registers to be interleaved and the registers to be written.

The vector coprocessor core 104 may also interleave register values across SIMD lanes with 2-element frequency. For example, for 8-way SIMD, the vector coprocessor core 104 may provide 2-element interleaving of two specified source registers as:

dst1[0]=src1[0];
dst1[1]=src1[1];
dst1[2]=src2[0];
dst1[3]=src2[1];
dst1[4]=src1[2];
dst1[5]=src1[3];
dst1[6]=src2[2];
dst1[7]=src2[3];
dst2[0]=src1[4];
dst2[1]=src1[5];
dst2[2]=src2[4];
dst2[3]=src2[5];
dst2[4]=src1[6];
dst2[5]=src1[7];
dst2[6]=src2[6];
dst2[7]=src2[7];

where the bracketed index value refers the SIMD lane. The vector coprocessor core 104 performs the 2-element interleaving as execution of a vector interleave instruction, which may be defined as:

VINTRLV2 src1/dst1, src2/dst2, where src1/dst1 and src2/dst2 specify source registers to be interleaved and the registers to be written.

The vector coprocessor core 104 may also interleave register values across SIMD lanes with 4-element frequency. For example, for 8-way SIMD, the vector coprocessor core 104 may provide 4-element interleaving of two specified source registers as:

dst1[0]=src1[0];
dst1[1]=src1[1];
dst1[2]=src1[2];
dst1[3]=src1[3];
dst1[4]=src2[0];
dst1[5]=src2[1];
dst1[6]=src2[2];
dst1[7]=src2[3];
dst2[0]=src1[4];
dst2[1]=src1[5];
dst2[2]=src1[6];
dst2[3]=src1[7];
dst2[4]=src2[4];
dst2[5]=src2[5];
dst2[6]=src2[6];
dst2[7]=src2[7];

where the bracketed index value refers the SIMD lane. The vector coprocessor core 104 performs the 4-element interleaving as execution of a vector interleave instruction, which may be defined as:

VINTRLV4 src1/dst1, src2/dst2, where src1/dst1 and src2/dst2 specify source registers to be interleaved and the registers to be written.

Embodiments of the vector coprocessor core 104 provide deinterleaving of register values across SIMD lanes. Corresponding to the single element interleaving described above, the vector coprocessor core 104 provides single element deinterleaving. For example, for 8-way SIMD, the vector coprocessor core 104 may provide single element deinterleaving of two specified source registers as:

dst1[0]=src1[0];
dst2[0]=src1[1];
dst1[1]=src1[2];
dst2[1]=src1[3];
dst1[2]=src1[4];
dst2[2]=src1[5];
dst1[3]=src1[6];
dst2[3]=src1[7];
dst1[4]=src2[0];
dst2[4]=src2[1];
dst1[5]=src2[2];
dst2[5]=src2[3];
dst1[6]=src2[4];
dst2[6]=src2[5];
dst1[7]=src2[6];
dst2[7]=src2[7];

The vector coprocessor core 104 performs the deinterleaving as execution of a vector interleave instruction, which may be defined as:

VDINTRLV src1/dst1, src2/dst2, where src1/dst1 and src2/dst2 specify source registers to be deinterleaved and the registers to be written.

Corresponding to the 2-element interleaving described above, the vector coprocessor core 104 provides 2-element deinterleaving. For example, for 8-way SIMD, the vector coprocessor core 104 may provide 2-element deinterleaving of two specified source registers as:

dst1[0]=src1[0];
dst1[1]=src1[1];
dst2[0]=src1[2];
dst2[1]=src1[3];
dst1[2]=src1[4];
dst1[3]=src1[5];
dst2[2]=src1[6];
dst2[3]=src1[7];
dst1[4]=src2[0];
dst1[5]=src2[1];
dst2[4]=src2[2];
dst2[5]=src2[3];
dst1[6]=src2[4];
dst1[7]=src2[5];
dst2[6]=src2[6];
dst2[7]=src2[7];

The vector coprocessor core 104 performs the 2-element deinterleaving as execution of a vector interleave instruction, which may be defined as:

VDINTRLV2 src1/dst1, src2/dst2, where src1/dst1 and src2/dst2 specify source registers to be deinterleaved and the registers to be written.

The processing elements 308 are configured to conditionally move data from a first register to second register based on an iteration condition of the nested loops being true. The conditional move is performed in a single instruction cycle. The processing elements 308 perform the conditional move as execution of a conditional move instruction, which may defined as:

VCMOV cond, src, dst where:

src and dst specify the register from which and to which data is to be moved; and cond specifies the iteration condition of the nested loops under which the move is to be performed.

The loop iteration condition (cond) may specify performing the move:

on every iteration of the inner-most loop (loop M);
on the final iteration of the inner-most loop;
in loop M−1, prior to entering loop M;
in loop M−2, prior to entering loop M−1;
in loop M−3, prior to entering loop M−2;
on the final iteration of loops M and M−1; or
on the final iteration of loops M, M−1, and M−2.

The processing elements 308 are configured to conditionally swap data values between two registers in a single instruction cycle based on a value contained in a specified condition register. Each processing element 308 executes the swap based on the condition register associated with the SIMD lane corresponding to the processing element 308. The processing elements 308 perform the value swap as execution of a conditional swap instruction, which may defined as:

VSWAP cond, src1/dst1, src2/dst2 where:

src1/dst1 and src2/dst2 specify the registers having values to be swapped; and cond specifies the condition register that controls whether the swap is to be performed.

In some embodiments, the swap is performed if the least significant bit of the condition register is set.

The processing elements 308 are configured to sort two values contained in specified registers in a single instruction cycle. The processing element 308 compares the two values. The smaller of the values is written to a first register, and the larger of the two values is written to a second register. The processing elements 308 perform the value sort as execution of a sort instruction, which may defined as:

VSORT2 src1/dst1, src2/dst2 where src1/dst1 and src2/dst2 specify the registers having values to be sorted. The smaller of the two values is written to dst1, and the larger of the two values is written to dst2.

The processing elements 308 include logic that generates a result value from values contained in three specified registers. A processing element 308 may, in a single instruction cycle, add three register values, logically "and" three register values, logically "or" three register values, or add two register values and subtract a third register value. The processing elements 308 perform these operations as execution of instructions, which may defined as:

VADD3 src1, src2, src3, dst where:

src1, src2, and src3 specify the registers containing values to be summed; and dst specifies the register to which the summation result is to be written.

VAND3 src1, src2, src3, dst where:

src1, src2, and src3 specify the registers containing values to be logically "and'd"; and dst specifies the register to which the "and" result is to be written.

VOR3 src1, src2, src3, dst where:

src1, src2, and src3 specify the registers containing values to be logically "or'd"; and dst specifies the register to which the "or" result is to be written.

VADIF3 src1, src2, src3, dst where:

src1 and src3 specify the registers containing values to be summed; src2 specifies the register containing a value to subtracted from the sum of src1 and src3; and dst specifies the register to which the final result is to be written.

The table lookup unit 310 is a processing unit separate from the processing elements 308 and the histogram unit 312. The table lookup unit 310 accelerates lookup of data values stored in tables in the memories 110, 112, 114. The table lookup unit 310 can perform N lookups (where N is the number of SIMD lanes of the vector coprocessor core 104) per cycle. The table lookup unit 310 executes the table lookups in a nested loop. The table lookup loop is defined by a VLOOP instruction that specifies table lookup operation. The vector command specified by VLOOP and the associated vector instructions cause the table lookup unit 310 to retrieve a specified set of values from one or more tables stored in the memories 110, 112, 114, and store the retrieved values in the memories 110, 112, 114 at a different specified location.

A table lookup vector command initializes address generators used to access information defining which values are to be retrieved from a lookup table, used to lookup table location in memory 110, 112, 114, and used to define where the retrieved lookup table values are to be stored. In each iteration of the table lookup vector command, the table lookup unit 310 retrieves information identifying the data to be fetched from the lookup table, applies the information in conjunction with the lookup table location to fetch the data, and stores the fetched data to memory 110, 112, 114 for subsequent access by a compute loop executing on the vector coprocessor core 104. The table lookup unit 310 may fetch table data from memories 110, 112, 114 based on a vector load instruction as disclosed herein, and store the fetched data to memories 110, 112, 114 using a vector store instruction as disclosed herein. Embodiments of the table lookup unit 310 may also fetch data from memories 110, 112, 114 using a vector table load instruction, which may be defined as:

VTLD<type>_<m>TBL_<n>PT    tbl—base[tbl_agen]
[V2], V0, RND_SAT: rnd_sat where:
- type specifies the data size (e.g., byte, half-word, word, etc.);
- _<m>TBL specifies the number of lookup tables to be accessed in parallel;
- _<n>PT specifies the number of data items per lookup table to be loaded;
- tbl_base specifies a lookup table base address;
- tbl_agen specifies an address generator containing offset to a given table;
- V2 specifies a vector register containing a data item specific offset into the given table;
- V0 specifies a vector register to which the retrieved table data is to be written; and
- RND_SAT: rnd_sat specifies a rounding/saturation mode to be applied to the table lookup indices.

As shown by the vector table lookup instruction, the table lookup unit 310 may fetch one or more data values from one or more tables simultaneously, where each of the multiple tables is located in a different bank of memories 110, 112, 114. Fetching multiple values from a table for a given index is advantageous when interpolation is to be applied to the values (e.g., bilinear or bicubic interpolation). Some embodiments of the table lookup unit 310 constrain the number of tables accessed and/or data values accessed in parallel. For example, the product of the number of tables accessed and the number of data values retrieved per table may be restricted to be less than the number of SIMD lanes of the vector coprocessor core 104. In some embodiments, the number of data values retrieved per table access may be restricted to be 1, 2, or 4. Table 1 below shows allowable table and value number combinations for some embodiments of an 8-way SIMD vector coprocessor core 104.

TABLE 1

Table Lookup Constraints

| Table type | Num items per lookup, num_data_per_lu | Number of parallel tables, num_par_tbl | | | |
|---|---|---|---|---|---|
| | | 1 | 2 | 4 | 8 |
| Byte | 1 | √ | √ | √ | √ |
| | 2 | √ | √ | √ | |
| | 4 | √ | √ | | |
| | 8 | √ | | | |
| Half word | 1 | √ | √ | √ | √ |
| | 2 | √ | √ | √ | |
| | 4 | √ | √ | | |
| | 8 | √ | | | |
| Word | 1 | √ | √ | √ | √ |
| | 2 | √ | √ | √ | |
| | 4 | √ | √ | | |
| | 8 | √ | | | |

The histogram unit 312 is a processing unit separate from the processing elements 308 and the table lookup unit 310. The histogram unit 312 accelerates construction of histograms in the memories 110, 112, 114. The histogram unit 312 provides construction of normal histograms, in which an addressed histogram bin entry is incremented by 1, and weighted histograms, in which an addressed histogram bin entry is incremented by a value provided as an element in a weight array input. The histogram unit 312 can perform N histogram bin updates (where N is the number of SIMD lanes of the vector coprocessor core 104) simultaneously. The histogram unit 312 executes the histogram bin updates in a nested loop. The histogram loop is defined by a VLOOP instruction that specifies histogram operation. The vector command specified by VLOOP and the associated vector instructions cause the histogram unit 312 to retrieve histogram bin values from one or more histograms stored in the memories 110, 112, 114, increment the retrieved values in accordance with a predetermined weight, and store the updated values in the memories 110, 112, 114 at the locations from which the values were retrieved.

A histogram vector command initializes the increment value by which the retrieved histogram bin values are to be increased, loads an index to a histogram bin, fetches the value from the histogram bin from memory 110, 112, 114, adds the increment value to the histogram bin, and stores the updated histogram bin value to memory 110, 112, 114. Bin value and weights may be signed or unsigned. Saturation may be applied to the updated histogram bin value in accordance with the type (e.g., signed/unsigned, data size, etc.) in conjunction with the store operation. Vector load instructions, as disclosed herein, may be used to initialize the increment value and load the bin index. Embodiments of the histogram unit 312 may fetch histogram bin values from memories 110, 112, 114 in accordance with a histogram load instruction, which may be defined as:

VHLD<type>_<m>HIST hist_base[hist_agen][V2], V0, RND_SAT: rnd_sat where:
- type specifies the data size (e.g., byte, half-word, word, etc.);
- _<m>HIST specifies the number of histograms to be accessed in parallel;
- hist_base specifies a histogram base address;
- hist_agen specifies an address generator containing offset to a given histogram;
- V2 specifies a vector register containing a histogram bin specific offset into the given histogram;
- V0 specifies a vector register to which the histogram bin value is to be written; and
- RND_SAT: rnd_sat specifies a rounding/saturation mode to be applied to the histogram indices.

Embodiments of the histogram unit 312 may store updated histogram bin values to memories 110, 112, 114 in accordance with a histogram store instruction, which may be defined as:

VHST<type>_<m>HIST V0, hist_base[hist_agen][V2]

where:
- type specifies the data size (e.g., byte, half-word, word, etc.);
- _<m> HIST specifies the number of histograms to be accessed in parallel;
- V0 specifies a vector register containing the histogram bin value to be written to memory;
- hist_base specifies a histogram base address;
- hist_agen specifies an address generator containing offset to a given histogram; and
- V2 specifies a vector register containing a histogram bin specific offset into the given histogram.

Embodiments of the processor 100 may be applied to advantage in any number of devices and/or systems that employ real-time data processing. Embodiments may be particularly well suited for use in devices that employ image and/or vision processing, such as consumer devices that that include imaging systems. Such devices may include an image sensor for acquiring image data and/or a display device for displaying acquired and/or processed image data. For example, embodiments of the processor 100 may be included in mobile telephones, tablet computers, and other mobile devices to provide image processing while reducing overall power consumption.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A vector processor comprising:
a plurality of execution units arranged in parallel;
a register file, comprising a plurality of registers coupled to the execution units; and
a plurality of load units, each of the load units configured to:
retrieve two values from memory in a single transaction; and
load each of the two values to a plurality of alternate registers of the plurality of registers in a single transaction.

2. A vector processor comprising:
a plurality of execution units arranged in parallel;
a register file, comprising a plurality of registers coupled to the execution units; and
a plurality of load units, each of the load units configured to:
retrieve values from locations of memory via alternate memory lanes in a single transaction; and
load the values to adjacent registers of the plurality of registers in a single transaction.

3. A vector processor comprising:
a plurality of execution units arranged in parallel;
a register file, comprising a plurality of registers coupled to the execution units; and
a plurality of load units, each of the load units configured to:
retrieve values from locations of the memory via adjacent memory lanes in a single transaction; and
load a copy of each of the values into a plurality of adjacent registers in a single transaction.

4. A vector processor comprising:
a plurality of execution units arranged in parallel;
a register file, comprising a plurality of registers coupled to the execution units;
a plurality of store units, each of the store units configured to:
retrieve a plurality of values from adjacent ones of the registers in a single transaction; and
write, in a single transaction, each of the values into memory at a location offset from a location of an immediately preceding write by one more than a number of values retrieved from the registers.

5. A vector processor comprising:
a plurality of execution units arranged in parallel;
a register file, comprising a plurality of registers coupled to the execution units;
a plurality of store units, each of the store units configured to:
retrieve a plurality of values from adjacent ones of the registers in a single transaction; and
write a sub-plurality of the retrieved values to locations in memory via adjacent memory lanes in a single transaction, the sub-plurality selected in accordance with a template value stored in a register of the vector processor.

6. A vector processor comprising:
a plurality of execution units arranged in parallel;
a register file, comprising a plurality of registers coupled to the execution units;
a plurality of store units, each of the store units configured to:
retrieve a plurality of values from adjacent ones of the registers in a single transaction; and
write the values to alternate locations in the memory in a single transaction.

7. A processor comprising:
a scalar processor core; and
a vector coprocessor core coupled to the scalar processor core;
the vector coprocessor core configured to execute vector instructions passed by the scalar processor core, the vector coprocessor core comprising:
a plurality of execution units arranged to execute an instruction in parallel;
a register file, comprising a plurality of registers coupled to the execution units;
a plurality of load units configured to execute a load instruction specifying upsampling by a factor of two while moving a plurality of data values from memory to the registers in a single transaction; and
a plurality of store units configured to execute a store instruction specifying downsampling by a factor of two while moving a plurality of data values from the registers to memory in a single transaction.

8. A processor comprising:
a scalar processor core; and
a vector coprocessor core coupled to the scalar processor core;
the vector coprocessor core configured to execute vector instructions passed by the scalar processor core, the vector coprocessor core comprising:
a plurality of execution units arranged to execute an instruction in parallel;
a register file, comprising a plurality of registers coupled to the execution units;
a plurality of load units configured to execute a load instruction specifying expansion of data stored in memory in compacted form while moving a plurality of data values from memory to the registers in a single transaction, the expansion based on a template stored in a register of the vector coprocessor core; and
a plurality of store units configured to execute a store instruction specifying compaction of data stored in the registers while moving a plurality of data values from the registers to memory in a single transaction, the compaction based on a template stored in a register of the vector coprocessor core.

9. A processor comprising:
a scalar processor core; and
a vector coprocessor core coupled to the scalar processor core;
the vector coprocessor core configured to execute vector instructions passed by the scalar processor core, the vector coprocessor core comprising:
a plurality of execution units arranged to execute an instruction in parallel;
a register file, comprising a plurality of registers coupled to the execution units;
a plurality of load units configured to execute a store instruction specifying a selectable distribution that causes at least one of the store units to move values retrieved from a plurality of adjacent ones of the registers to locations in memory via alternate memory lanes in a single transaction.

10. A vector processor comprising:
a plurality of execution units arranged in parallel;
a register file, comprising a plurality of registers coupled to the execution units; and
a plurality of load units, at least one of the load units configured to move a predetermined number of values in adjacent memory locations to adjacent registers as controlled by expansion control information, the expansion control information having a number of bits equal to the number of registers, with a number of 1 bits equal to the predetermined number of values, a register storing all 0s if a corresponding bit of the expansion control information 0 and a next of the predetermined number of values if the corresponding bit of the expansion control information is 1.

11. A vector processor comprising:
a plurality of execution units arranged in parallel;
a register file, comprising a plurality of registers coupled to the execution units;
a plurality of store units, at least one of the store units configured to move values in adjacent registers to a predetermined number of adjacent memory locations as controlled by collation control information, the collation control information having a number of bits equal to the number of adjacent registers, with a number of 1 bits equal to the predetermined number of values, a memory storing a value stored in a next adjacent register having corresponding bit of the collation control information of 1.

12. A processor comprising:
a scalar processor core; and
a vector coprocessor core coupled to the scalar processor core;
the vector coprocessor core configured to execute vector instructions passed by the scalar processor core, the vector coprocessor core comprising:
a plurality of execution units arranged to execute an instruction in parallel;
a register file, comprising a plurality of registers coupled to the execution units;
a plurality of load units, at least one of the load units configured to move a predetermined number of values in adjacent memory locations to adjacent registers as controlled by expansion control information, the expansion control information having a number of bits equal to the number of registers, with a number of 1 bits equal to the predetermined number of values, a register storing all 0s if a corresponding bit of the expansion control information 0 and a next of the predetermined number of values if the corresponding bit of the expansion control information is 1; and
a plurality of store units, at least one of the store units configured to move values in adjacent registers to a predetermined number of adjacent memory locations as controlled by collation control information, the collation control information having a number of bits equal to the number of adjacent registers, with a number of 1 bits equal to the predetermined number of values, a memory storing a value stored in a next adjacent register having corresponding bit of the collation control information of 1.

* * * * *